United States Patent
Bednarz, Jr. et al.

(10) Patent No.: US 10,127,327 B2
(45) Date of Patent: Nov. 13, 2018

(54) CLOUD-BASED IMAGE PROCESSING WEB SERVICE

(71) Applicant: Adobe Systems Incorporated, San Jose, CA (US)

(72) Inventors: Thomas E. Bednarz, Jr., Natick, MA (US); Winsha Chen, Redwood City, CA (US); Ming-En Cho, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 168 days.

(21) Appl. No.: 14/283,896

(22) Filed: May 21, 2014

(65) Prior Publication Data

US 2015/0339268 A1   Nov. 26, 2015

(51) Int. Cl.

| | |
|---|---|
| *G06F 3/00* | (2006.01) |
| *G06F 17/30* | (2006.01) |
| *G06F 17/21* | (2006.01) |
| *G06F 17/22* | (2006.01) |
| *H04N 7/01* | (2006.01) |
| *H04L 29/08* | (2006.01) |

(52) U.S. Cl.
CPC ...... *G06F 17/30896* (2013.01); *G06F 17/218* (2013.01); *G06F 17/2247* (2013.01); *H04L 67/02* (2013.01)

(58) Field of Classification Search
CPC ........ G06F 9/44; G06F 17/30067; G06F 8/47; G06F 3/00; G06F 17/00; G06T 15/07
USPC .......................................... 715/248; 348/441
See application file for complete search history.

(56) References Cited

U.S. PATENT DOCUMENTS

| | | | | |
|---|---|---|---|---|
| 7,222,306 | B2* | 5/2007 | Kaasila | G06F 3/0481 715/760 |
| 2005/0278691 | A1* | 12/2005 | MacPhee | G06T 13/00 717/104 |
| 2010/0149189 | A1* | 6/2010 | Kota | G06T 11/20 345/442 |
| 2010/0229108 | A1* | 9/2010 | Gerson | A63F 13/12 715/757 |

(Continued)

OTHER PUBLICATIONS

JavaFX CSS Reference Guide, captured by www.archive.org on Apr. 30, 2012.*

(Continued)

*Primary Examiner* — Cesar B Paula
*Assistant Examiner* — Jian Huang
(74) *Attorney, Agent, or Firm* — Finch & Maloney PLLC

(57) ABSTRACT

Techniques are disclosed for interactively viewing and manipulating elements of a web page or application layout uploaded from a client to a server. Elements of the layout, such as graphics and image properties, are extracted, encoded and used to generate a JSON file describing the layout along with a sprite sheet of all of the images. The JSON file and the sprite sheet are then stored as a rendition of the layout within a cloud environment. A web-based application can be used to retrieve the JSON file and the sprite sheet. The JSON and sprite sheet may be used to create a preview environment. Additional data in the JSON can be used to generate an information panel in the web browser for representing relationships between the layers, styles and other properties of the layout in the information panel and the elements displayed in the preview.

19 Claims, 11 Drawing Sheets

(56) References Cited

U.S. PATENT DOCUMENTS

| | | | | |
|---|---|---|---|---|
| 2011/0029902 A1* | 2/2011 | Bailey | ............... | G06F 21/36 |
| | | | | 715/764 |
| 2011/0050687 A1* | 3/2011 | Alyshev | ............ | G06T 15/00 |
| | | | | 345/419 |
| 2012/0249870 A1* | 10/2012 | Senster | ............... | G06F 8/52 |
| | | | | 348/441 |
| 2013/0225293 A1* | 8/2013 | Glassenberg | ....... | G06T 13/40 |
| | | | | 463/32 |
| 2014/0002449 A1* | 1/2014 | Lu | ...................... | G06T 13/80 |
| | | | | 345/419 |
| 2014/0095227 A1* | 4/2014 | Parker | ............... | G06Q 30/04 |
| | | | | 705/5 |

OTHER PUBLICATIONS

"Powerful New CSS- and JavaScript Techniques," posted by "The Smashing Editorial," Jun. 21, 2012, https://www.smashingmagazine.com/2012/06/powerful-new-cssjavascript-techniques/.*

\* cited by examiner

CLOUD-BASED IMAGE PROCESSING WEB SERVICE

FIELD OF THE DISCLOSURE

This disclosure relates to the field of data processing, and more particularly, to techniques for interactively viewing and manipulating elements of a web page or application layout.

BACKGROUND

The process of designing and building a website or application can involve several phases, where different people make contributions at each phase. For instance, in one phase, a designer may plan, develop and lay out the content for the website or application. The website or application layout may take the form of a document containing images, text, backgrounds, fonts and other assets to be incorporated into the website or application. Such a document can have a structured format, such as an Adobe Photoshop® Document, or PSD file, with multiple imaging layers for masks, transparency, text, composite images, colors, and other properties. Subsequently, in another phase, a developer may construct code for the website or application using the layout (e.g., the PSD file) from the designer. Such layout documents can be very large, for example, on the order of three gigabytes. Furthermore, the structure of the layout document may be such that only certain applications, such as Photoshop®, can process the data in the layout document. Additionally, for large or complex files, such processing may require large amounts of processing power and time.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
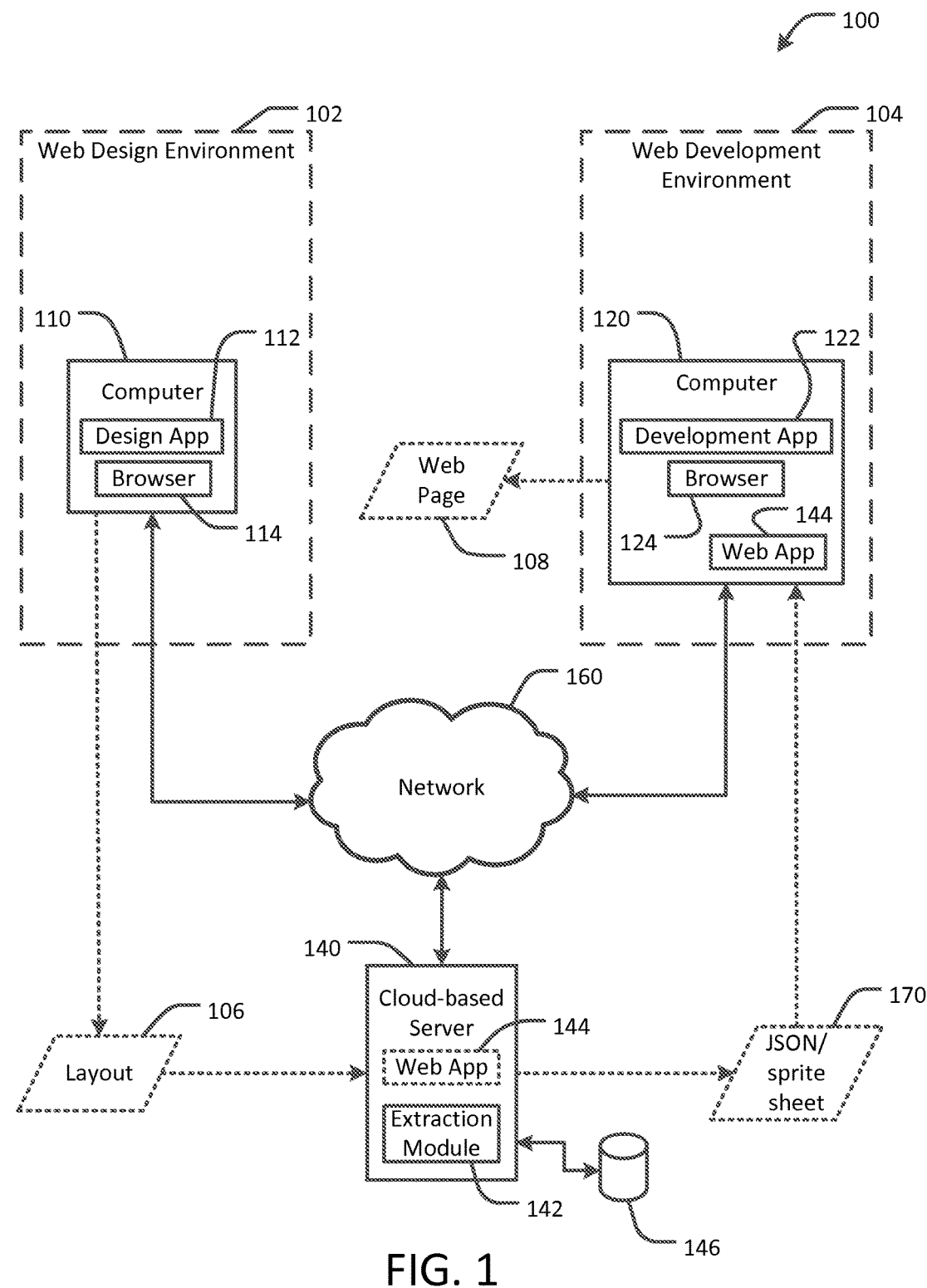
FIG. 1 illustrates an example client-server system for interactively viewing and manipulating elements of a web page or application layout, in accordance with an embodiment of the present invention.

As discussed above, designers and developers may have different roles, and therefore may use different tools. For example, a designer may use an image processing application, such as Photoshop®, to design the layout of a website or application, while a developer may use a different set of tools, such as Adobe Dreamweaver CC, to generate the software for the website or application. Thus, if the developer is given, for example, a PSD file, the developer may need to use Photoshop®, or another suitable application that is compatible with the layout data, to extract the data from the layout and convert it into a format that is compatible with the website or application development tools. This may be undesirable for at least several reasons. First, applications such as Photoshop® include tools that are not designed for web or application production workflows. Second, images in PSD or other image files may take a long time and a lot of processing power to render. Existing image file previewing techniques, including image preview web plug-in modules, are not suitable because their performance is slow and they can only display flat renditions of multi-layer images. Further, such image preview techniques do not provide information about any image layer other the top-most layer.

To this end, and in accordance with an embodiment of the present invention, techniques are disclosed for interactively viewing, extracting and manipulating elements of a web page or application layout, as well as generating graphical assets based on a single layer or multiple layers of information in the layout. The layout may, for example, be stored in a structured file such as a Photoshop document (PSD). The layout is uploaded from a client computing system to a server computing system, such as a cloud-based server. Upon ingestion of the layout by the server, an extraction process is performed on the layout. The extraction process extracts information about the elements of the web page or application, such as graphics and image properties, and creates a hierarchical tree data structure (e.g., a JavaScript Object Notation (JSON) file) representing the contents of the layout along with a sprite sheet representing the images in the layout. In general, the hierarchical tree data structure contains nodes with attribute-value data pairs representing objects that can be transmitted between a server and an application (e.g., a web browser) for rendering the elements of the web page or application. The sprite sheet contains data representing one or more images or visual elements in the layout, also referred to in this disclosure as sprites. The hierarchical tree data structure and the sprite sheet are then stored as a rendition of the layout within the cloud, which is accessible by other user computing systems. A web-based application (e.g., an application residing on the cloud and executable on a browser) can be used to retrieve the hierarchical tree data structure and the sprite sheet for the layout from the cloud. The hierarchical tree data structure can be used by the application to create a tree of organizational elements (e.g., a div element) and image rendering elements (e.g., a canvas element) within a HyperText Markup Language (HTML) preview environment. The hierarchical tree data structure can further be used to retrieve images, or sprites, from the sprite sheet. Canvas and HTML document compositing can then be used to form a preview of the layout in a web browser frame or window. The preview is derived from the hierarchical tree data structure and the sprite sheet rather than the original layout document. Additional data in the hierarchical tree data structure can be used to generate an information panel in the web browser. The information panel can be used to display user-selectable representations of the layers, styles and other properties (e.g., colors, fonts, gradients, element boundaries, positions, etc.) of the layout and the elements of the layout (e.g., assets such as images, graphics, backgrounds, text, etc.), as shown in the preview. For example, when a user selects a color chip, font or gradient in the information panel, the layers that use the selected properties may be highlighted in the layout preview. Likewise, when a layer is selected in the layout preview area, only the colors, fonts and gradients that are used in that layer may be made active (the rest may be, e.g., greyed out, disabled or hidden). Numerous configurations and variations will be apparent in light of this disclosure.

The term "web browser," as used in this disclosure, generally refers to any application for retrieving, presenting and traversing information resources. Such information resources may be referenced via a Uniform Resource Identifier or Locator (URI/URL) and contain any type of content. Non-limiting examples of a web browser include Internet Explorer, Safari, Firefox, Opera and Google Chrome.

The terms "layout," "web page layout," and "application layout" as used in this disclosure, generally refer to elements that can be used for rendering a web page or application and the arrangement and style treatments of the elements. The layout may contain information (e.g., metadata, Cascade Style Sheet, etc.) for using, locating, or organizing those elements within the web page or application interface. Such elements may, for example, include text, images, graphics, and other assets such as fonts, colors, gradients and backgrounds.

The term "image layer," as used in this disclosure, generally refers to a virtual layer of information in a document, such as an Adobe Photoshop® Document, or PSD file, for encoding images, masks, transparency, text, composite images, colors, and other properties. In some cases, data in one image layer can be viewed or edited by a user independently of data in other image layers. An image layers can be virtually layered on top of or beneath other image layers such that images and other objects residing in one layer partially obscure or supplement images and other objects in lower-lying image layers.

The term "sprite sheet," as used in this disclosure, generally refers to any type of data that represents sprites, which are computer-generated graphics. Sprites are two-dimensional images or animations that can be integrated with other graphics. In some embodiments, the sprite sheet may include multiple sprites along with other data. For instance, some designers may combine numerous small images or icons into a larger image called a sprite sheet or tile set. The larger image can portioned or sectioned to obtain the individual sprites, as needed. For example, a Cascade Style Sheet (CSS) may be used to select sprites from the sprite sheet to display at different locations on the web page. A sprite sheet may, for instance, contain one 10 kB image representing a combination of ten 1 kB images of a web page. The single, larger image may then be combined into, and downloaded with, a single HTTP request, and rendered by a web browser using a corresponding CSS. Reducing the number of HTTP requests in this manner can improve the speed at which a web page is loaded.

The term "cloud computing environment," as used in this disclosure, generally refers to any client-server architecture in which at least some computation and/or data storage is relocated from a client computing system to one or more remote servers that provide the computation or data storage as a commodity or utility. A cloud may, for example, include a large collection of resources that can be interchangeably provisioned and shared among many clients. For example, copies of a file may be stored locally and/or remotely in one or more clouds. In another example, a cloud-based service may be one in which at least a portion of the service (e.g., a data processing service) is performed by a remote server on behalf of a client.

According to an example embodiment, a hierarchical tree data structure is an arrangement of data items related virtually above, below, and/or at the same level as one another. The data items can be mathematically modeled as interrelated nodes having a tree-like structure, where child nodes are connected to their respective parent nodes by branches, and a root node (i.e., a node having no parent) forms the vertex of the tree. For example, in an object database, such as a Content Repository for Java (JCR), data objects and relationships between the data objects may be stored in a hierarchical tree data structure.

Example System

FIG. 1 illustrates an example client-server system 100 for exchanging information between devices, in accordance with an embodiment. Some portions of the system 100 can operate within a design environment 102 and a development environment 104. For example, the design environment 102 may be one in which a user uses various computer-implemented design tools, such as a design application 112, to design a web page or application layout 106. The development environment 104 may be one in which another user uses various computer-implemented web page or application development tools, such as a development application 122, to construct a web page 108 or application based on the layout. The system 100 includes one or more computers 110, 120, and one or more servers 140, each electronically interconnected via a network 160 (e.g., a wide area network, such as the Internet, or a local area network). Generally, the computers 110, 120 can be any type of device, such as a personal computer (PC), tablet, or smart phone, configured to send and receive data (e.g., the layout 106, JSON/sprite sheet files 170, or any other data) to and from the server 140. The computer 110 or any other computing device in the design environment 102 can include the design application 112 (e.g., Photoshop or another suitable image processing application) and a browser 114. The computer 120 or any other computing device in the development environment 104 can include the development application 122 (e.g., Adobe Dreamweaver CC or another suitable web development application) and a browser 124. The server 140 can include an extraction module 142 for extracting information from the layout 106 and generating the JSON/sprite sheet files 170, such as described in further detail below. The server 140 can further include a web application 144 (e.g., Adobe Parfait), which can be configured to be downloaded to the computers 102 or 104 for execution in conjunction with the browsers 114 or 124. The extraction module 142, the web application 144, or both can be provided as a web service in which the server (e.g., server 140) performs the functionality of the respective module remotely from the client (e.g., computer 102, 104), or as a web application in which the client downloads software for performing the functionality of the respective module from the server and executes it locally. The layout 106, the JSON/sprite sheet files 170, or any combination of these may be stored by the server 140 in a suitable storage, memory, or database 146.

By way of example, the JSON file 170 may include high level image information (size, etc.) and a tree structure denoting the hierarchy of layers in the PSD, where each layer object is expressed in the tree hierarchy. The type of the layer, along with its ID, name, and greatest non-transparent pixel boundaries may also be encoded in the JSON file 170. Depending upon the layer type, additional properties may be encoded. For example, text layers include the raw text, font style runs, etc. Gradient fill layers include the gradient information. Effects settings for the layers, and information relating the layer to boundaries within the generated sprite sheet may also be encoded.

Figure 2A:
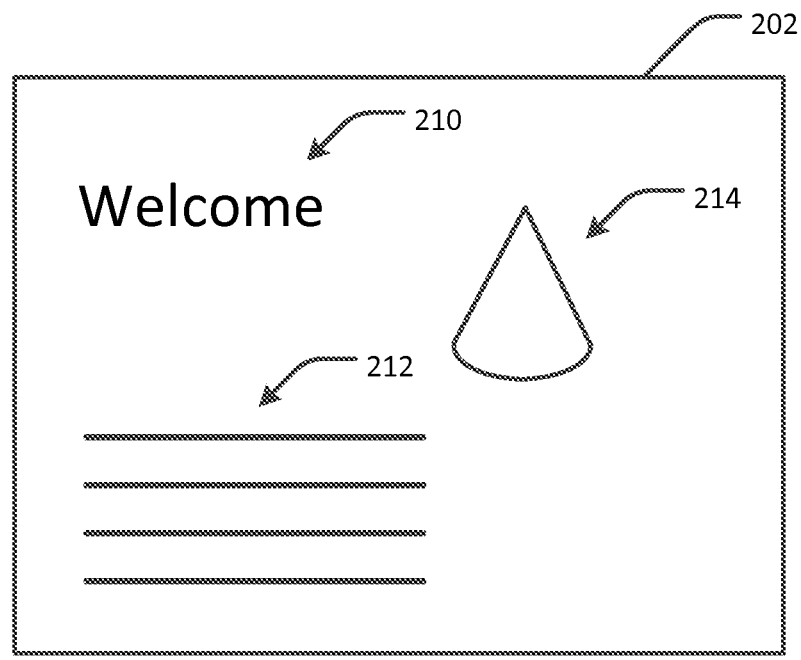
FIG. 2A depicts an example web page layout, in accordance with an embodiment of the present invention.
Figure 2B:
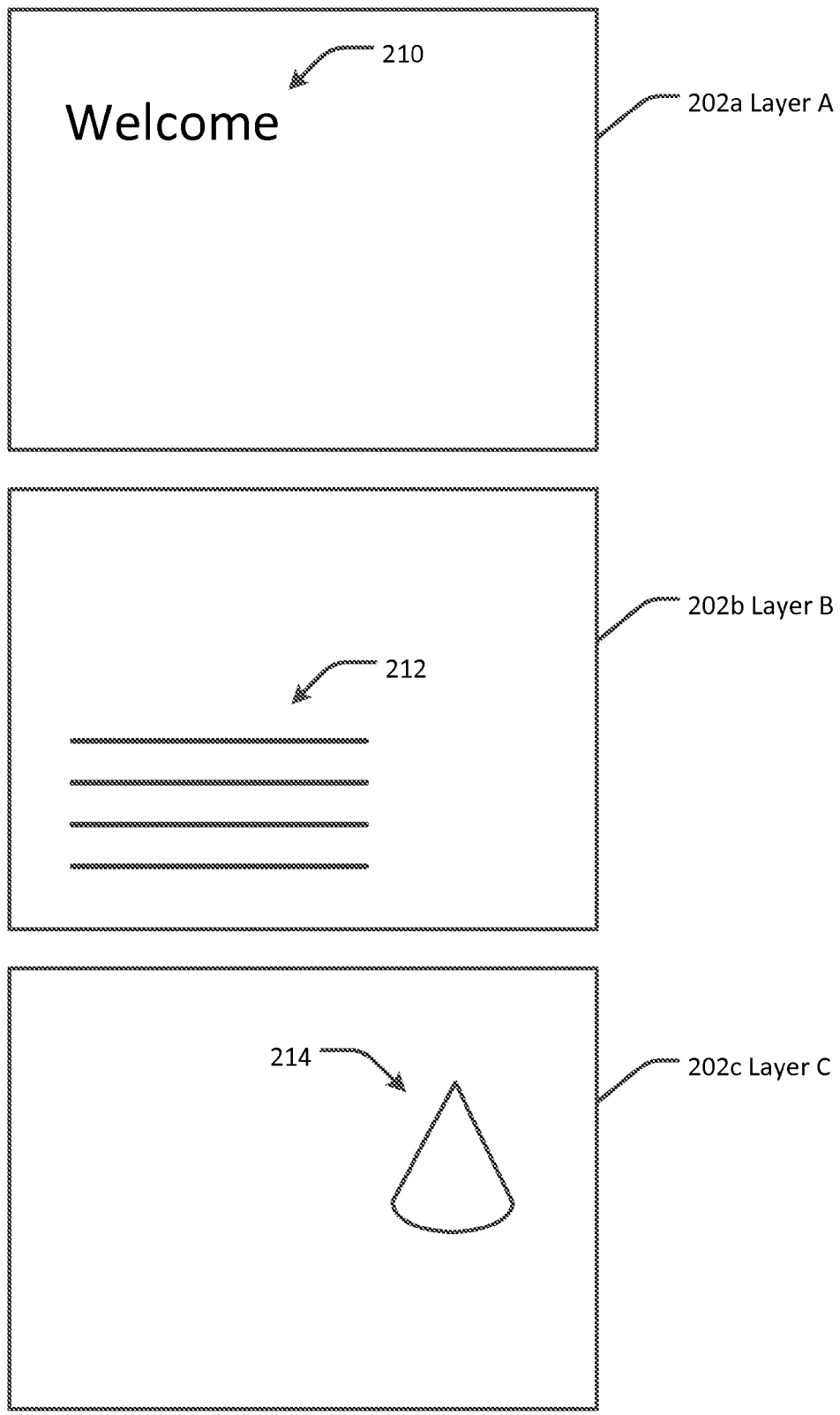
FIG. 2B depicts several layers of the example layout of FIG. 2A, in accordance with an embodiment of the present invention.

FIG. 2A depicts an example web page layout 202, in accordance with an embodiment of the present invention. The layout 202 may, for example, be generated by the design application 112 of FIG. 1 as a PSD file or other suitable image file (e.g., layout file 106). The layout can include various elements 210, 212, 214 (e.g., text, graphics, images, etc.) that can be used to generate code for rendering a web page in a web browser or other suitable application. In some cases, although separately encoded, the web page can be visually and functionally similar to the layout 202. In some cases, the elements 210, 212, 214 may exist on one or more different layers of the layout 202. FIG. 2B depicts several layers 202a, 202b, 202c of the example layout 202. For example, Layer A 202a may include element 210, Layer B 202b may include element 212, and Layer C 202c may include element 214. It will be understood that the layout 202 can include any number of layers (one or more), and each layer can include one or more elements (e.g., elements 210, 212, 214). When superimposed upon each other, the layers 202a, 202b, 202c can produce the layout 202 in which the layers appear coincident when rendered by a browser (e.g., the browser 114 or 124 of FIG. 1).

Figure 3:
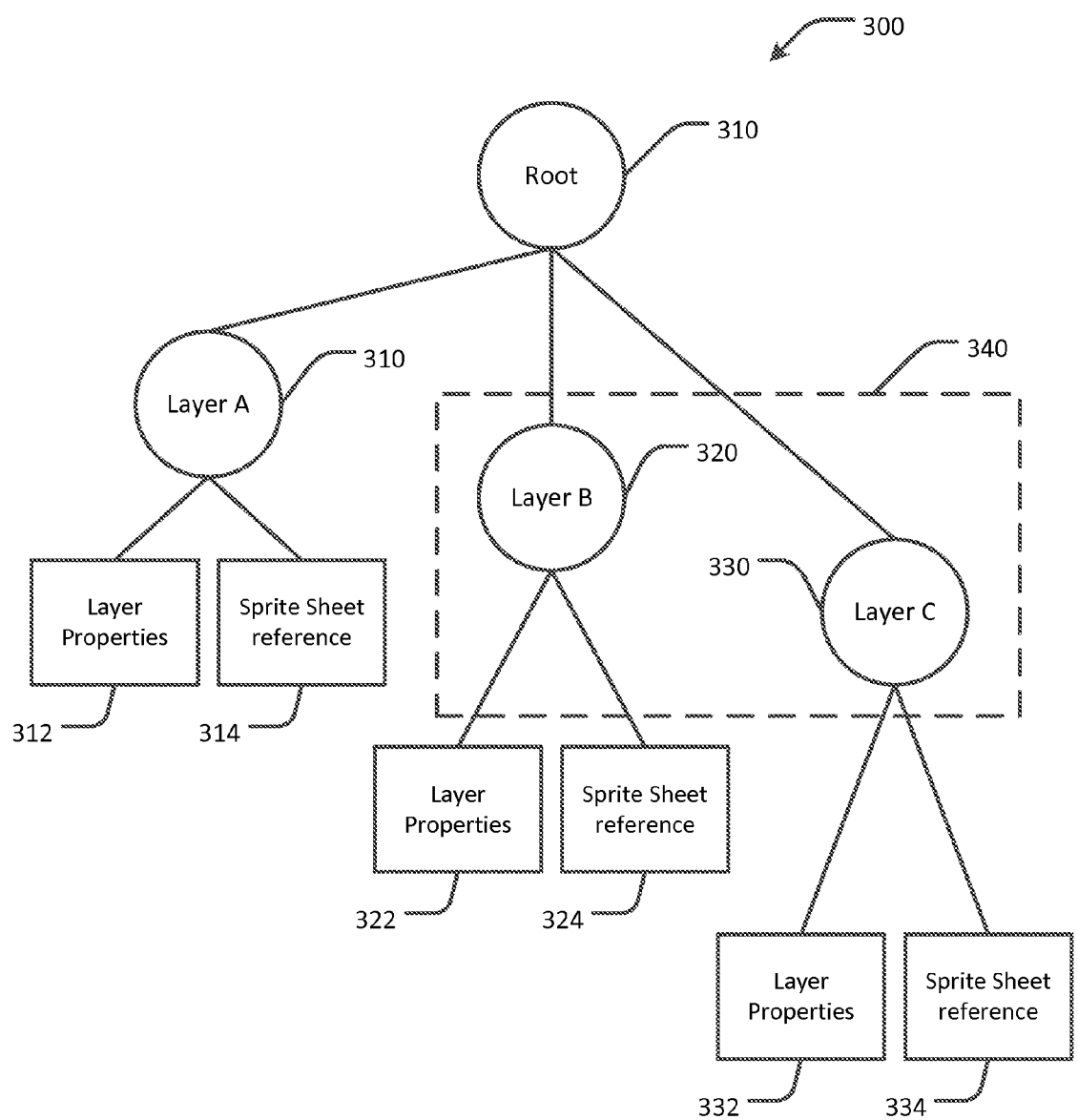
FIG. 3 depicts an example hierarchical tree representation of the example layout of FIGS. 2A and 2B, in accordance with an embodiment of the present invention.

FIG. 3 depicts an example hierarchical tree representation 300 of the layout 202 of FIGS. 2A and 2B, in accordance with an embodiment of the present invention. Such a tree representation 300 may, for example, be generated by the extraction module 142 of FIG. 1. The tree includes a root note 310, and child nodes 310, 320, 330 for Layer A 202a, Layer B 202b, and Layer C 202c of the layout 202. The root node 310 can contain high level image information relating to a web page or application layout document, such as the size of the layout. Each child node 310, 320, 330 represents one layer of the web page or application layout (e.g., a Photoshop® layer). In some embodiments, the layout can contain multiple layers having composite graphical elements or elements with effects (e.g., elements in different layers may be blended together or otherwise combined to produce a visual effect that is different than the elements would produce if viewed separately). Such multiple layers may be grouped together (e.g., such as indicated by the dashed line 340 for a grouping of layers B 320 and C 330). The child nodes 310, 320, 330 can contain additional information representing elements of the respective layer. Referring to the example layout of FIG. 2B, child node 310 may contain information about element 210, child node 320 can contain information about element 212, and child node 330 can contain information about element 214. Such information may include layer properties or attributes 312, 322, 332 (e.g., colors, fonts, gradients, text, effects, element pixel boundaries, and certain other assets in the layout 202) and references 314, 324, 334 to sprites in a sprite sheet (e.g., a separate file containing the visual elements in the layout 202). The references 314, 324, 334 may, for example, indicate pixel boundaries of the sprites within the sprite sheet that correspond to any visual elements located in the respective layer (e.g., 202a, 202b, 202c) of the layout. The information contained in tree representation 300 may be stored, for example, in a JSON data format (e.g., as a set of attribute-value data pairs in the JSON file 170 of FIG. 1) or in another suitable data format.

Figure 4:
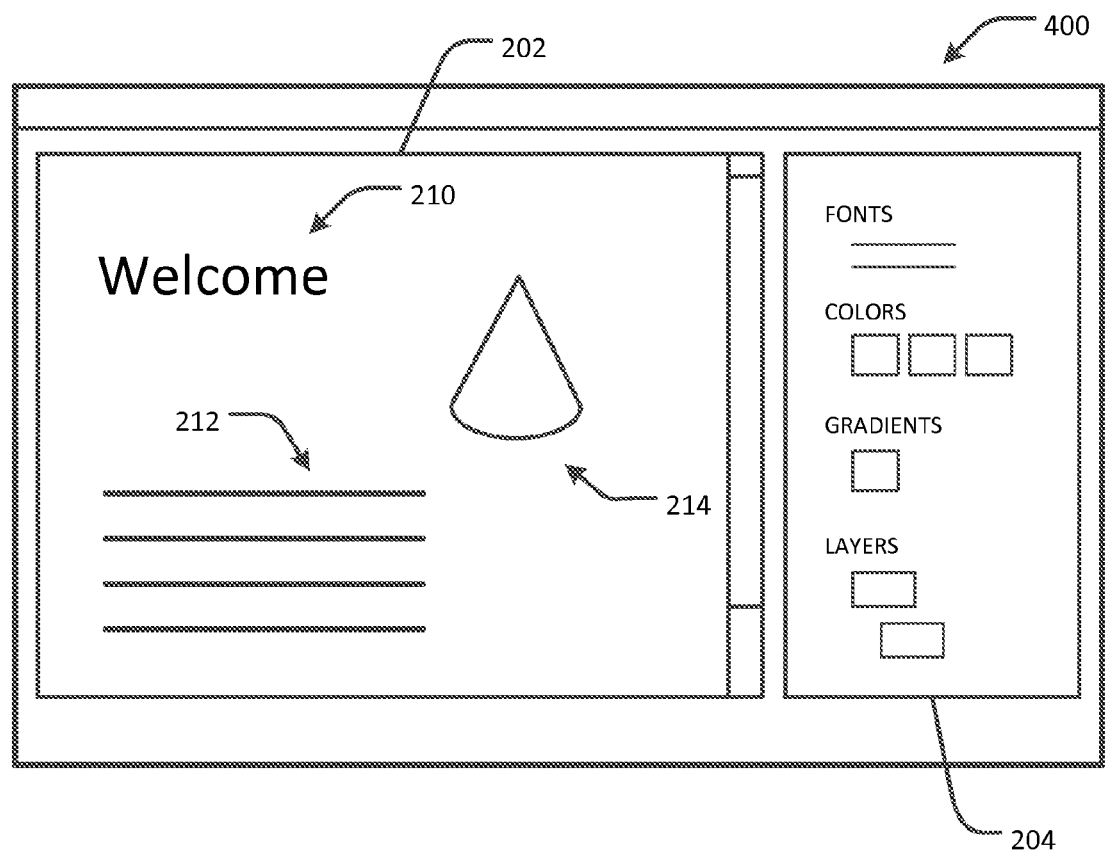
FIG. 4 depicts an example graphical user interface (GUI), in accordance with an embodiment of the present invention.

FIG. 4 depicts an example graphical user interface (GUI) 400, in accordance with an embodiment of the present invention. The graphical user interface may, for example, be generated at least in part by the web application 144 of FIG. 1 and configured to be displayed by the browser 114 or 124. Within the GUI 400 can be rendered a preview of the layout 202 and an information panel 204 containing information related to elements of the layout 202 (e.g., elements 210, 212, 214). For example, the information panel 204 may display graphical or textual representations of the fonts, colors, gradients and layers of the layout 202, including thumbnail images of visual elements of the layout 202. Each of these representations can be user-selectable (e.g., using a keyboard, mouse or other suitable input device). Selecting any of the representations causes the GUI 400 to display further detailed information associated with the selected element of the layout 202. Examples of such detailed information are described below with respect to FIGS. 5 and 6. In some cases, the information panel 204 can include multiple user-selectable tabs or pages (not shown) for displaying the representations. In some other cases, the information panel 204, the layout 202, or both can be displayed in resizable or separate windows of the GUI 400.

Figure 5:
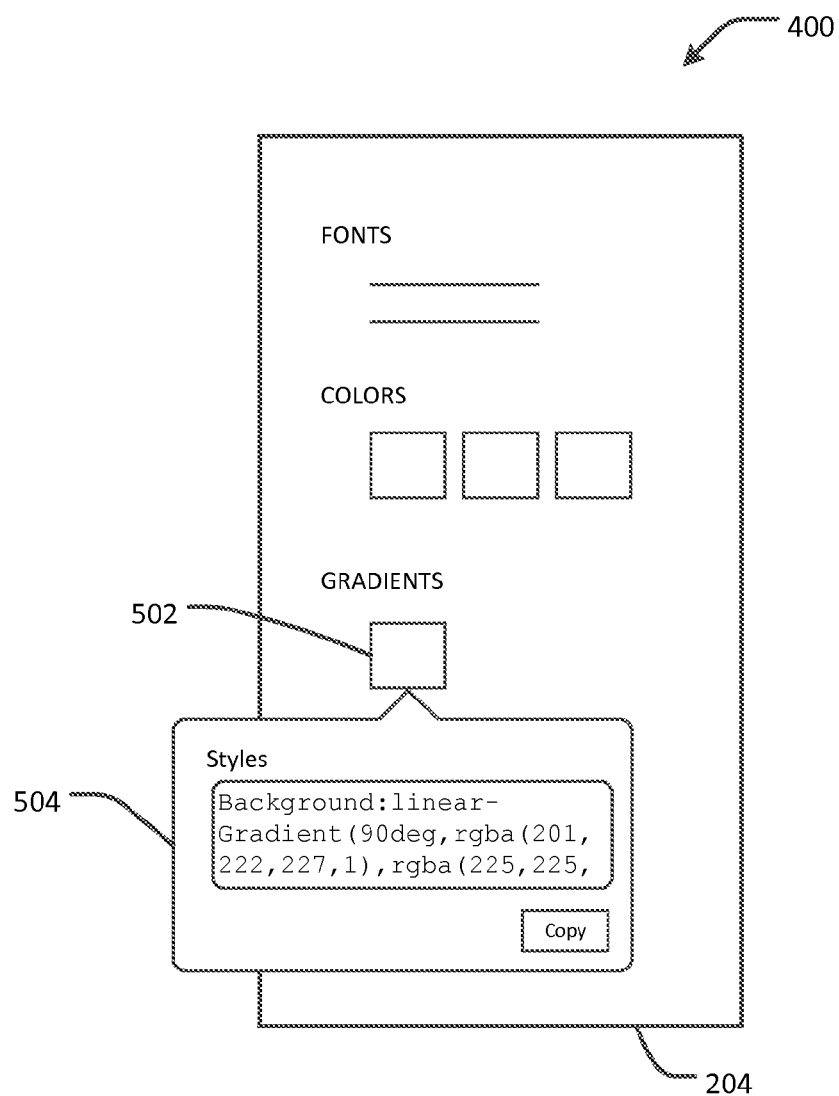
FIG. 5 depicts a portion of the example GUI of FIG. 4 in further detail, in accordance with an embodiment of the present invention.

FIG. 5 depicts a portion of the example GUI 400 of FIG. 4 in further detail, in accordance with an embodiment of the present invention. In FIG. 5 is shown the information panel 204, which, as described above, includes one or more representations of the example layout 202 (such as depicted in FIG. 4). For example, one of the representations may include gradients 502 in at least one of the layers of the layout 204. A gradient may, for instance, be a background color or pattern within one of the layers. The information panel 204 may include other representations (e.g., representations of layout elements, such as fonts, colors, styles, etc.) that are graphically represented in a manner similar to the gradients 502. The user may select any of the representations with an input device, such as a mouse, to obtain more information about the corresponding layout element or property. In this example, the user has selected the gradients representation 502. In response to this selection, the GUI 400 can be configured to display a pane, balloon, dialog box, pop-up window, or other suitable graphical interface element 504 containing the information relating to the selected layout element. Such information can be generated by the extraction module 142 of FIG. 1 and may include, for example, code fragments, parameters, image data, or other information and assets that can be used to develop a web page (e.g., the web page 108 of FIG. 1) or application containing the respective layout element or having the respective layout property. For example, the GUI 400 may provide a "copy" button or similar GUI-based input which, when selected by the user, causes the code fragment or other information in the pane 504 to be copied onto an electronic clipboard for subsequent use in and by, e.g., the development application 122 of FIG. 1. In this manner, the developer may, for instance, extract, from the layout 202, the information and assets needed to reproduce all or a portion of the layout 202 in the web page 108. As will be appreciated in light of this disclosure, the amount of information displayed in the pane 504 can depend on the size of the pane, the font used, and other factors such that not necessarily all of the information is viewable; however, the "copy" button may be configured to copy all of the information including portions that are not viewable in the pane 504.

Figure 6:
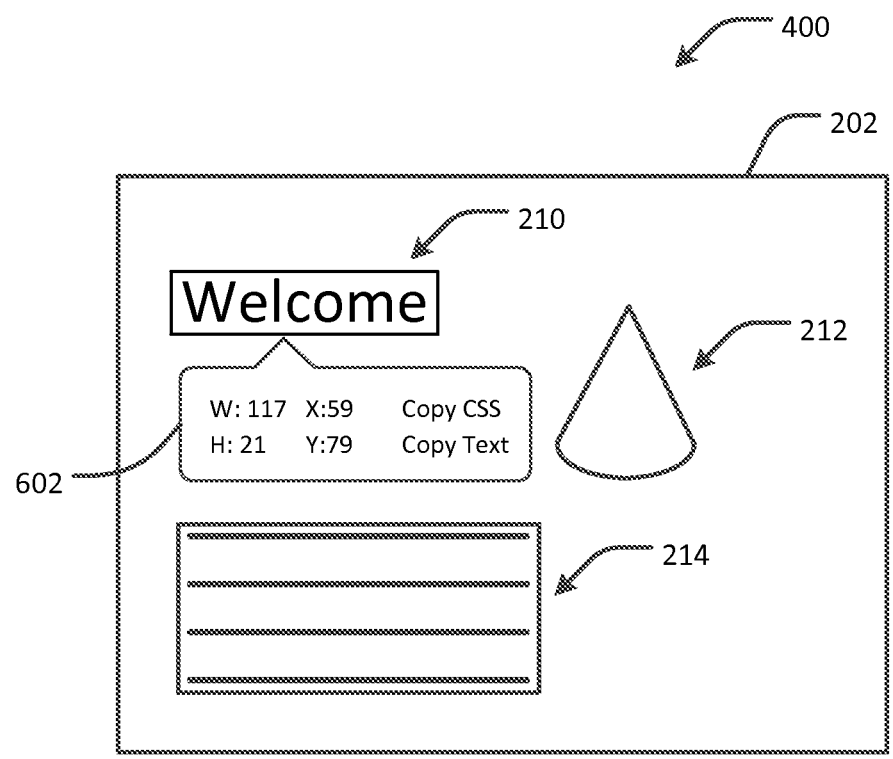
FIG. 6 depicts another portion of the example GUI of FIG. 4 in further detail, in accordance with an embodiment of the present invention.

FIG. 6 depicts another portion of the example GUI 400 of FIG. 4 in further detail, in accordance with an embodiment of the present invention. In FIG. 6 is shown the example layout 202, including elements 210, 212 and 214. Representations of the elements 210, 212, 214 can be displayed in the information panel 204 (not shown). The user may select any of the representations with an input device, such as a mouse, to obtain more information about the corresponding layout element or property. In this example, the user has selected the element 210. In response to this selection, the GUI 400 can be configured to display a pane, balloon, dialog box, pop-up window, or other suitable graphical interface element 602 containing the information relating to the selected layout element. Such information can be generated by the extraction module 142 of FIG. 1 and may include, for example, code fragments, parameters (e.g., pixel offsets), image data, or other information and assets that can be used to develop a web page (e.g., the web page 108 of FIG. 1) or application containing the respective layout element or having the respective layout property. The element 602 may, for example, include selectable controls for extracting, or copying, code (e.g., CSS or text) for the element 210. In this manner, the developer may, for instance, extract, from the layout 202, the information and assets needed to reproduce all or a portion of the layout 202 in the web page 108 or application. In some embodiments, the user can also select two objects on the screen and get the offsets between the objects (e.g., displayed within the GUI 400 in a manner similar to element 210 described above). For example, if two element representations are selected, then the distances between the corresponding elements may be obtained. If the elements are related as a parent and child, the distances relative to the parent's bounds may be obtained. Other examples will be apparent in light of the present disclosure.

Example Methodologies

Figure 7:
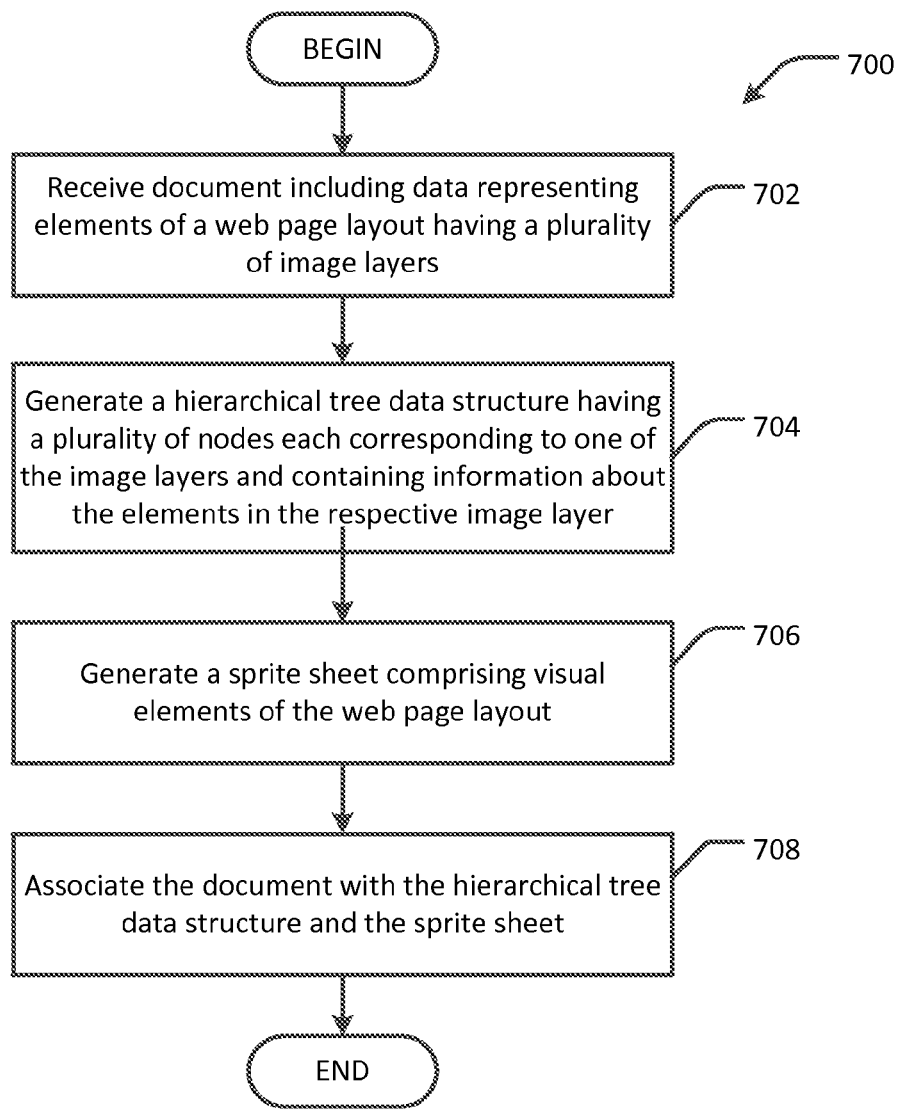
FIG. 7 is a flow diagram representative of an example methodology for interactively viewing and manipulating elements of a web page layout, in accordance with an embodiment of the present invention.

FIG. 7 is a flow diagram of an example methodology 700 for interactively viewing and manipulating image data, in accordance with an embodiment. The example methodology 700 may, for example, be implemented by the extraction module 142 of FIG. 1. The method 700 begins by receiving (702) a document including data representing elements of a web page or application layout. The layout can have a plurality of image layers. The document may include, for example, a PSD or other image document. The method 700 continues by generating (704) a hierarchical data structure. The data structure has a plurality of nodes each corresponding to one of the image layers, such as described above with respect to the example in FIG. 3. Each node contains information about the elements in the respective image layer. The information can be encoded in an attribute-value data pair format and stored in a JSON file. For example, as depicted and described with respect to FIG. 3, the nodes of the tree can represent different layers of the visual image (with the root node 310 representing the layout document generally), and each node corresponds to data elements or objects, such as layer properties and sprites in the sprite sheet. The method 700 continues by generating (706) a sprite sheet representing visual image elements, or sprites, from the layout. The method 700 continues by associating (708) the document with the data structure and the sprite sheet, such that the original document may, for example, be virtually linked to the JSON file and the sprite sheet. By pre-calculating the information in the JSON file and the sprite sheet, the resulting user experience can be highly optimized and faster in a web-based environment since the JSON file and the sprite sheet, rather than the original document, can be used to render a preview of the web page or application layout, such as described in further detail below.

In some embodiments, one sprite sheet can be generated for the graphical assets extracted from each layer of the layout. As mentioned above, in some other embodiments, the layout can contain multiple layers having composite graphical elements or elements with effects (e.g., elements in different layers may be blended together or otherwise combined to produce a visual effect that is different than the elements would produce if viewed separately). In such embodiments, one sprite sheet can be generated for the graphical assets extracted from multiple layers of the layout (e.g., where some layers or layer groups are flattened to deal with compositing and effects).

Figure 8:
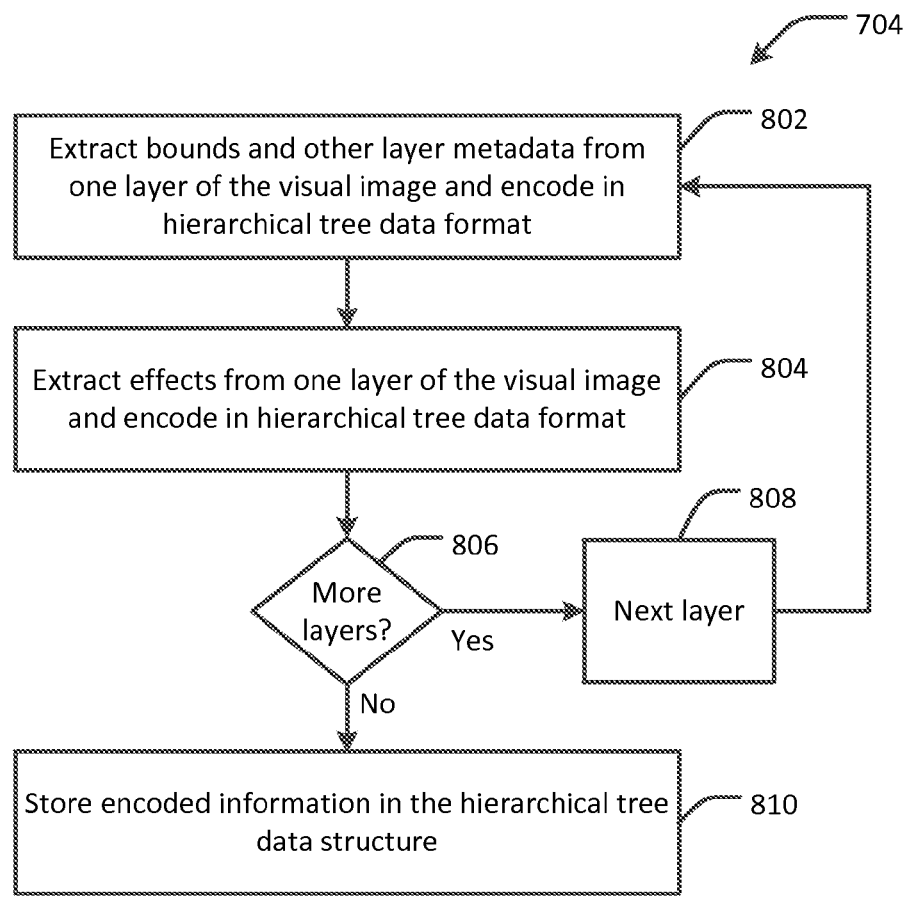
FIG. 8 is a flow diagram representing a portion of the example methodology of FIG. 7, in accordance with an embodiment of the present invention.

FIG. 8 is a flow diagram of a portion of the example methodology 704 of FIG. 7, in accordance with an embodiment. The example methodology 704 may, for example, be implemented by the extraction module 140 of FIG. 1. As discussed above, one aspect of the methodology 700 includes generating (704) the data structure representing the hierarchical tree based on the data extracted from the document. In this example embodiment, the method 704 includes extracting (802) bounds and other layer metadata from one layer of the visual image, and encoding the metadata or other information in a particular data format, such as a JSON attribute-value data pair format. The method 704 continues by extracting (804) effects from the layer and similarly encoding the effect information. The process of extracting bounds/metadata (802) and effects (804) repeats (806) for each layer (808) of the visual image. The method 704 continues by storing (810) the encoded information in the hierarchical tree data structure.

Figure 9:
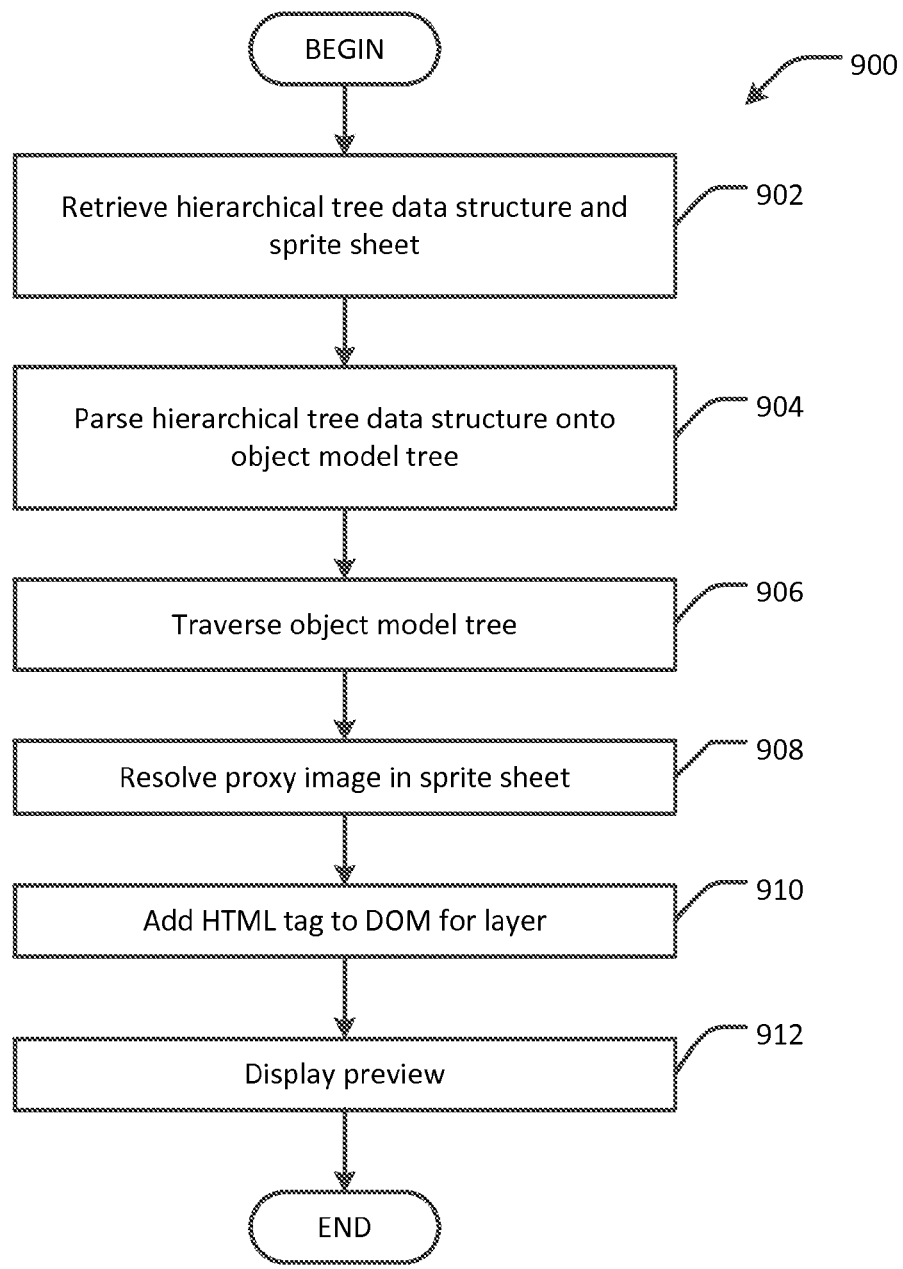
FIG. 9 is a flow diagram representative of another example methodology for interactively viewing and manipulating elements of a web page layout, in accordance with an embodiment of the present invention.

FIG. 9 is a flow diagram of another example methodology 900 for interactively viewing and manipulating image data, in accordance with an embodiment. The example methodology 900 may, for example, be implemented by the web application 144 of FIG. 1. The method 900 begins by retrieving (902) a hierarchical tree data structure (e.g., a JSON data structure) and sprite sheet, such as those generated by the extraction module 142 in accordance with method 700, described above with respect to FIG. 7. The hierarchical tree data structure and corresponding sprite sheet can be used to display a preview of the web page or application layout from which they were previously generated, such as depicted and described with respect to FIGS. 4-6. The method 900 continues by parsing (904) the hierarchical tree data structure into an object model tree, which may, for example, be traversed (906) bottom-up in a reverse Z-order. In other words, in some embodiments the object model tree can be traversed in successive layers beginning from the background layer. In some other embodiments, such as where graphical elements from multiple layers are blended or otherwise combined, the object model tree can be traversed in the opposite order; that is, from the leaf node up to the root node of the tree. The method 900 continues by resolving (908) one or more proxy images in the sprite sheet that are associated with the respective objects in the tree. The method 900 continues by adding (910) HTML canvas tags to the Document Object Model (DOM) corresponding to the JSON data objects (e.g., nodes 310, 320, 330). The method 900 continues by displaying (912), in a web browser (e.g., the browser 124 of FIG. 1) a preview of the layout using the object model tree, resolved proxy images and associated HTML tags. As this data is previously calculated, the time to obtain the visual elements is reasonably quick and no computation costs are incurred on the server (e.g., no compositing, rendering, etc., is necessary).

As mentioned above, in some embodiments the layout can include blended or composited elements from different layers. In one such embodiment, the hierarchical tree structure can be traversed from the leaf nodes toward the root node of the tree. During the traversal, the non-transparent bounds of each layer are compared against the bounds of all previously traversed layers that contain blending modes. If the layer being traversed intersects with a layer having an element that is designated to be blended or composited with another element in a different layer, then that layer is noted in a map/dictionary structure (e.g., the map may use the ID of the blending mode layer as a key and the value is a list of layers that are affected by that blending mode). The total number of layers with blend modes that intersect the layer in question are returned from this process. If the number of layers that contain blending modes that intersect with the layer in question is greater than one, then the data obtained about these layers and the layers that are overlapping is coalesced into a single entry in the JSON data structure. The union of the blend mode area (which may be thought of as a net that is cast over the layout) can be used for comparisons with this combined layer entity. If the layer has a blending mode applied to it and if that layer does not overlap with any other previously found layers that contain a blending mode, that layer along with its non-transparent pixel bounds are noted in a list structure. After all layers have been processed, the JSON is augmented with the following information: (i) all layers that are affected by a blend mode have the layer ID of the layer that is the lowest within the compositing tree that is affecting the blending; and (ii) all layers that are driving blending mode operations have a list of all of the layer IDs of the other layers that are being affected by this setting. For all of the layers driving blend mode operations, additional entries can be added to the sprite sheet. These sprites can include a flattened representation of the driving blend mode layer along with any affected layers. This flattened sprite can be included along with the original, un-combined layer sprites in the sheet. Within the JSON data structure, an additional set of properties can be added to the driving layer entries defining the position of this flattened sprite representation. When building out the web browser/client side representation (preview) of the layout, a check is made when building the HTML DOM. If the layer in question is a blend mode driver, instead of building out the sub-tree of discrete HTML DOM elements, the flattened sprite is used instead. If, within the resulting preview, the user toggles the visibility of the layers involved in a blend mode operation, one of two things can happen. First, if the user shuts off the visibility of the layer with the applied blend mode, the discrete representations of the affected layers are swapped in for the flattened sprite. Second, if the user toggles the visibility of an element that is or would be affected by the blend mode layer, a request is made of the server to generate a flattened sprite on the fly that consists of the current selection state of the layers involved with the blend modes. Note that the name of the asset is hashed so that it can be retained server side and cached so that future requests for the same content can be fulfilled from the data storage service and not require the cost of on-the-fly computation.

Example Computing Device

Figure 10:
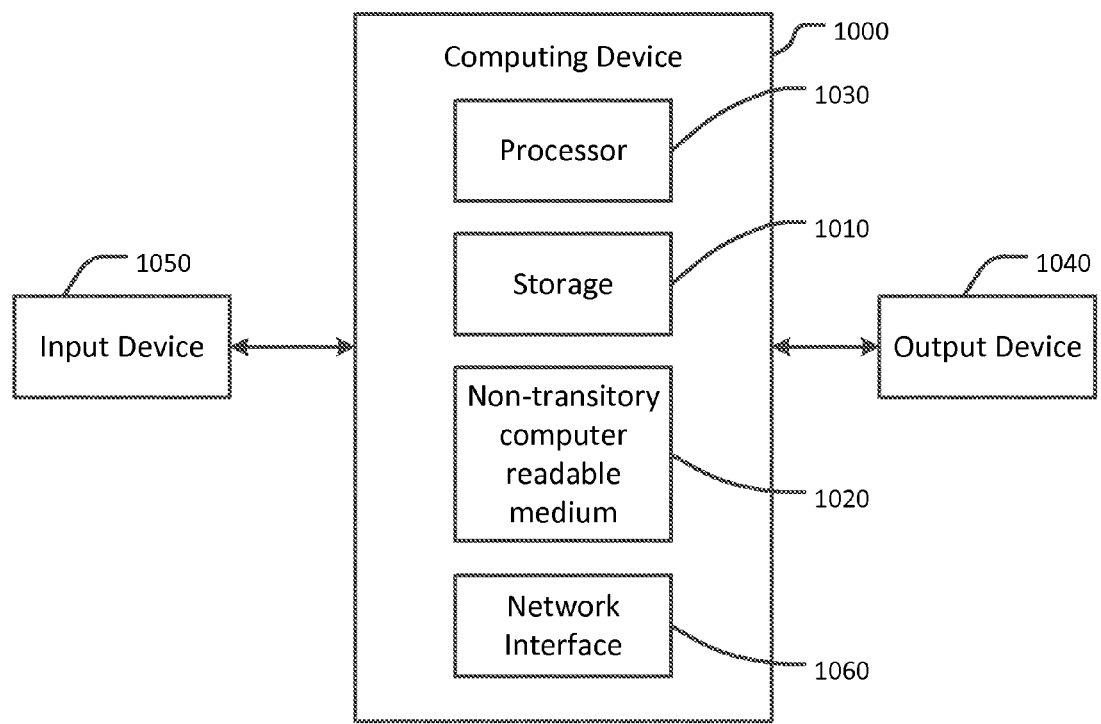
FIG. 10 is a block diagram representing an example computing device that may be used in accordance with an embodiment of the present invention.

FIG. 10 is a block diagram representing an example computing device 1000 that may be used to perform any of the techniques as variously described in this disclosure. For example, the computers 110, 120, server 140, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to a camera 1052 for detecting a pattern displayed by another computing device, and a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the design application 112, browser 114, development application 122, browser 124, web application 144, and extraction module 142, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computers 110, 120, and the server 140, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a document including data representing elements of a layout (e.g., a web page layout or an application layout), the layout having a plurality of image layers; generating, based on the data, a hierarchical tree data structure having a plurality of nodes, each node corresponding to one of the image layers and containing information about the elements in the respective image layer; generating, based on the data, a sprite sheet comprising visual elements of the layout; and associating the document with the hierarchical tree data structure and the sprite sheet. In some cases, the process includes storing the hierarchical tree data structure and the sprite sheet within a cloud computing environment. In some cases, the process includes extracting, from the data, the information about the elements in one of the image layers. In some such cases, the process further comprises encoding the extracted information in an attribute-value data pair format. In some other such cases, the process includes repeating the extracting and the encoding for each of the image layers. In some other such cases, the process includes storing the encoded information in the hierarchical tree data structure at the node corresponding to the image layer containing the respective element. In some cases, the process includes retrieving, in response to a user input selecting the document, the hierarchical tree data structure and the sprite sheet associated with the document. In some such cases, the process includes generating, for display in a web browser, a preview of the document based on the hierarchical tree data structure and the sprite sheet. In some other such cases, the process includes generating, for display in the web browser, an information panel having user-selectable representations of the elements of the layout based on the hierarchical tree data structure and the sprite sheet. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a processor, a document including data representing elements of a layout, the layout having a plurality of image layers and at least one visual effect associated with a visual element of the layout;
   generating, by the processor and based on the data, a hierarchical tree data structure having a plurality of nodes, each node corresponding to one of the image layers and containing information about the elements in the respective image layer;
   generating, by the processor and based on the data, a sprite sheet comprising the visual element of the layout;
   encoding and storing, in the node of the hierarchical tree data structure corresponding to the image layer containing the respective visual element, a reference to a pixel boundary of the visual element within the sprite sheet and metadata representing the at least one visual effect associated with the respective visual element;
   virtually linking, by the processor, the document to each of the hierarchical tree data structure and the sprite sheet, to enable access to the hierarchical tree data structure and to the sprite sheet via the virtual links upon access of the document;

traversing, by the processor, each node in the hierarchical tree data structure to obtain the metadata representing the at least one visual effect associated with the respective visual element comparing bounds of the image layer corresponding to the traversed node against the bounds of all previously traversed image layers; and combining data representing at least two of the traversed image layers into a single node based on the comparison and using the visual effect metadata stored in and obtained from the hierarchical tree data structure.

2. The method of claim 1, further comprising storing, by the processor, the hierarchical tree data structure and the sprite sheet within a cloud computing environment.

3. The method of claim 1, further comprising extracting, by the processor and from the data, the information about the elements in one of the image layers.

4. The method of claim 3, further comprising encoding, by the processor, the extracted information in an attribute-value data pair format, and storing, by the processor, the encoded information in the hierarchical tree data structure at the node corresponding to the image layer containing the respective element.

5. The method of claim 4, further comprising repeating, by the processor, the extracting and the encoding for each of the image layers.

6. The method of claim 1, further comprising retrieving, by the processor and in response to a user input selecting the document, the hierarchical tree data structure and the sprite sheet associated with the document.

7. The method of claim 6, further comprising generating, by the processor for display in a web browser, a preview of the document based on the hierarchical tree data structure and the sprite sheet.

8. The method of claim 7, further comprising generating, by the processor for display in the web browser, an information panel having user-selectable representations of the elements of the layout based on the hierarchical tree data structure and the sprite sheet.

9. The method of claim 8, further comprising presenting, by the processor for display in the web browser and in response to a user input selecting one of the representations in the information panel, the information about the element corresponding to the selected representation based on the hierarchical tree data structure.

10. A system comprising:
a storage; and
a processor operatively coupled to the storage, the processor configured to execute instructions stored in the storage that when executed cause the processor to carry out a process comprising:
receiving a document including data representing elements of a layout, the layout having a plurality of image layers and at least one visual effect associated with a visual element of the layout;
generating, based on the data, a hierarchical tree data structure having a plurality of nodes, each node corresponding to one of the image layers and containing information about the elements in the respective image layer;
generating, based on the data, a sprite sheet comprising the visual element of the layout;
encoding and storing, in the node of the hierarchical tree data structure corresponding to the image layer containing the respective visual element, reference to a pixel boundary of the visual element within the sprite sheet and metadata representing the at least one visual effect associated with the respective visual element;
virtually linking the document to each of the hierarchical tree data structure and the sprite sheet, to enable access to the hierarchical tree data structure and to the sprite sheet via the virtual links upon access of the document;
traversing each node in the hierarchical tree data structure to obtain the metadata representing the at least one visual effect associated with the respective visual element
comparing bounds of the image layer corresponding to the traversed node against the bounds of all previously traversed image layers; and
combining data representing at least two of the traversed image layers into a single node based on the comparison and using the visual effect metadata stored in and obtained from the hierarchical tree data structure.

11. The system of claim 10, wherein the process further comprises storing the hierarchical tree data structure and the sprite sheet within a cloud computing environment.

12. The system of claim 10, wherein the process further comprises extracting, from the data, the information about the elements in one of the image layers.

13. The system of claim 12, wherein the process further comprises encoding the extracted information in an attribute-value data pair format, and storing the encoded information in the hierarchical tree data structure at the node corresponding to the image layer containing the respective element.

14. The system of claim 13, wherein the process further comprises repeating the extracting and the encoding for each of the image layers.

15. The system of claim 10, wherein the process further comprises retrieving, in response to a user input selecting the document, the hierarchical tree data structure and the sprite sheet associated with the document.

16. The system of claim 15, wherein the process further comprises generating, for display in a web browser, a preview of the document based on the hierarchical tree data structure and the sprite sheet, and generating, for display in the web browser, an information panel having user-selectable representations of the elements of the layout based on the hierarchical tree data structure and the sprite sheet.

17. A non-transitory computer program product having instructions encoded thereon that when executed by one or more processors cause a process to be carried out, the process comprising:
receiving a document including data representing elements of a layout, the layout having a plurality of image layers and at least one visual effect associated with a visual element of the layout;
generating, based on the data, a hierarchical tree data structure having a plurality of nodes, each node corresponding to one of the image layers and containing information about the elements in the respective image layer;
generating, based on the data, a sprite sheet comprising the visual element of the layout;
encoding and storing, in the node of the hierarchical tree data structure corresponding to the image layer containing the respective visual element, a reference to a pixel boundary of the visual element within the sprite sheet and metadata representing the at least one visual effect associated with the respective visual element;

virtually linking the document to each of the hierarchical tree data structure and the sprite sheet, to enable access to the hierarchical tree data structure and to the sprite sheet via the virtual links upon access of the document;

traversing each node in the hierarchical tree data structure to obtain the metadata representing the at least one visual effect associated with the respective visual element;

comparing bounds of the image layer corresponding to the traversed node against the bounds of all previously traversed image layers; and combining data representing at least two of the traversed image layers into a single node based on the comparison and using the visual effect metadata stored in and obtained from the hierarchical tree data structure.

18. The method of claim 1, wherein the comparing includes determining whether the image layer being traversed intersects with an image layer having an element that is designated to be blended or composited with another element in a different image layer.

19. The method of claim 1, wherein generating the sprite sheet includes flattening at least two visual elements corresponding to the combined data into a single visual element.

* * * * *